(12) United States Patent
Horner et al.

(10) Patent No.: US 12,470,157 B2
(45) Date of Patent: Nov. 11, 2025

(54) HIGH-INTEGRITY ACTUATOR CONTROLLER AND CONTROL SYSTEMS

(71) Applicant: HONEYWELL INTERNATIONAL INC., Charlotte, NC (US)

(72) Inventors: Darrell W. Horner, Tempe, AZ (US); Ronald Vaughan, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 167 days.

(21) Appl. No.: 18/527,667

(22) Filed: Dec. 4, 2023

(65) Prior Publication Data

US 2024/0305224 A1    Sep. 12, 2024

Related U.S. Application Data

(60) Provisional application No. 63/488,615, filed on Mar. 6, 2023.

(51) Int. Cl.
| | | |
|---|---|---|
| *B64C 13/00* | (2006.01) | |
| *H02P 6/16* | (2016.01) | |
| *H02P 6/28* | (2016.01) | |
| *H02P 9/02* | (2006.01) | |
| *H02P 27/08* | (2006.01) | |

(52) U.S. Cl.
CPC .......... *H02P 6/16* (2013.01); *H02P 6/28* (2016.02); *H02P 9/02* (2013.01); *H02P 2209/09* (2013.01)

(58) Field of Classification Search
CPC ...... H02P 6/28; H02P 6/16; H02P 9/02; H02P 2209/09

USPC ..................................................... 318/400.04
See application file for complete search history.

(56) References Cited

U.S. PATENT DOCUMENTS

| | | | |
|---|---|---|---|
| 5,274,554 A * | 12/1993 | Takats | G06F 11/1641 |
| | | | 701/33.9 |
| 7,984,878 B2 * | 7/2011 | Hirvonen | B64C 13/505 |
| | | | 244/196 |
| 8,058,833 B2 | 11/2011 | Wilkens | |
| 9,327,825 B2 | 5/2016 | White et al. | |
| 10,394,241 B2 | 8/2019 | Debouk et al. | |
| 10,483,880 B2 | 11/2019 | Peck, Jr. et al. | |
| 11,742,789 B2 | 8/2023 | Errico et al. | |

(Continued)

*Primary Examiner* — Gabriel Agared
(74) *Attorney, Agent, or Firm* — Ingrassia Fisher & Lorenz, LLP (57) ABSTRACT

A high-integrity electromechanical actuator control system includes a system function controller, a plurality of actuator controllers, and at least one electromechanical actuator. Each actuator controller includes a primary channel having a first controller, a second controller, and a duty cycle computation circuit, and includes a backup channel having a backup controller. The first controller receives digital actuator control commands from two functional control channels and supplies first digital duty cycle commands. The second controller receives digital actuator control commands from two functional control channels and supplies second digital duty cycle commands. The duty cycle computation circuit computes an average of the first and second duty cycle commands and generates pulse width modulated (PWM) commutation control signals based on the computed average. The backup controller receives digital actuator control commands from two different functional control channels and generates and supplies backup PWM commutation control signals.

17 Claims, 6 Drawing Sheets

(56) References Cited

U.S. PATENT DOCUMENTS

| | | | |
|---|---|---|---|
| 2008/0018282 A1* | 1/2008 | Potter | H02P 6/14 |
| | | | 318/466 |
| 2010/0001678 A1* | 1/2010 | Potter | G05B 19/0421 |
| | | | 318/569 |
| 2020/0091844 A1* | 3/2020 | Furukawa | H02P 6/153 |
| 2020/0362796 A1 | 11/2020 | Li et al. | |
| 2022/0009616 A1 | 1/2022 | Galvo et al. | |
| 2023/0291336 A1* | 9/2023 | Horner | H03K 7/08 |

* cited by examiner

HIGH-INTEGRITY ACTUATOR CONTROLLER AND CONTROL SYSTEMS

CROSS REFERENCE TO RELATED APPLICATION

The present application claims the benefit of U.S. Provisional Patent Application No. 63/488,615, filed Mar. 6, 2023, which is hereby incorporated by reference herein in its entirety.

TECHNICAL FIELD

The present disclosure generally relates to aircraft actuation control, and more particularly relates to a high integrity actuator controller and control system that provide mitigation against common mode failures.

BACKGROUND

Modern aircraft are evolving to a more electric architecture for actuation control. For example, flight control surface control, engine tilt control, propeller pitch control, and numerous other control systems are adopting a more electric control architecture. This type of architecture uses electromechanical actuators (EMAs) with electromechanical motors. The EMAs are controlled by electromechanical actuator controllers (EMACs).

Some aircraft actuation systems are flight critical and thus require high integrity EMA control to prevent loss of control or erroneous control. Because of this flight criticality, EMACs, which contain electronic circuitry and software, must adhere to various industry standards. Some examples of industry standards include SAE ARP4754A (Guidelines for Development of Civil Aircraft Systems), SAE ARP4761 (Guidelines and Methods for Conducting the Safety Assessment Process on Civil Airborne Systems and Equipment), and AC/AMC 20-152A (Development Assurance for Airborne Electronic Hardware (AEH)). Each of these industry standards provides varied guidance.

For example, SAE ARP4754A establishes guidance for "Development Assurance," and as one means of achieving these objectives, introduces the use of "independence" (between design elements) as a strategy to overcome systemic errors in the development or production of a product. SAE ARP4761 describes the use of fault trees, and "independence" to overcome common cause and common mode failures (that could bypass redundancy). And AC/AMC 20-152A provides certification guidance for the use of commercially available off-the-shelf (COTS) electronic devices and provides a definition of "complex" versus "simple" devices. This standard further establishes that complex devices may need mitigation at the hardware, software, or system level to prevent inadvertent alteration of "critical configuration settings" of the complex COTS device to prevent an undesired failure.

To achieve suitable levels of safety when operating a single controlled device/system (e.g., surfaces, engine, or other), it is assumed that the device/system must be controlled by a high integrity EMAC and EMA where erroneous control by common mode failure is mitigated.

Or, to achieve the suitable level of safety to prevent loss of control, it is assumed that system functional redundancy is required. Such redundancy can be achieved either by multiple redundant control devices/systems (e.g., surfaces, engines, other) to achieve a given function, or by control redundancy to individual devices/systems.

As a result, high integrity EMACs can require the control system to contain one or more of the following system/design features: (1) redundant control system commands for availability; (2) independent command versus monitoring architecture in the control system; (3) redundancy to ensure that one EMAC failure can be mitigated by a backup EMAC; (4) EMAC dissimilarity (independence) to ensure that both EMACs do not fail at the same time due to a common failure; (5) high integrity EMAC command of the EMA position; and (6) independence within the EMAC electronics to assure the ability to shut-off control around a misbehaving complex AEH in the event of a detected failure.

Each of the above system/design features can result in a relatively heavy, complex, and costly system—both in design and production. Hence, there is a need for a highly efficient EMAC system architecture that meets industry standards for flight critical actuation systems, while exhibiting less weight, complexity, and cost as compared to presently known architectures. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a high-integrity electromechanical actuator control system includes a plurality of actuator controllers, and at least one electromechanical actuator. Each actuator controller is adapted to receive digital actuator control commands supplied from at least two function control channels. Each actuator controller is configured, upon receipt of the actuator control commands, to implement a command voting scheme to verify actuator control command integrity and, upon verifying actuator control command integrity, to generate and supply analog actuator position commands. Each actuator controller includes a primary channel and a backup channel, where each primary channel comprises a first controller, a second controller, and a duty cycle computation circuit, and each backup channel comprises a backup controller. Each electromechanical actuator is coupled to receive the actuator position commands from at least one of the actuator controllers and is configured, upon receipt thereof, to actuate a device. The first controller is coupled to receive the digital actuator control commands supplied from two of the functional control channels and is configured, upon receipt thereof, to supply first digital duty cycle commands. The second controller is coupled to receive the digital actuator control commands supplied from two of the functional control channels and is configured, upon receipt thereof, to supply second digital duty cycle commands. The duty cycle computation circuit coupled to receive the first digital duty cycle commands and the second digital duty cycle commands and is configured, upon receipt of the first and second duty cycle commands to (i) compute an average of the first and second duty cycle commands and (ii) generate pulse width modulated (PWM) commutation control signals based on the computed average. The backup controller is adapted to receive the digital actuator control commands supplied from two different functional control channels and configured, upon receipt thereof, to generate and supply backup PWM commutation control signals.

In another embodiment, a high-integrity electromechanical actuator control system includes a system function controller, a plurality of actuator controllers, and at least one electromechanical actuator. The system function controller includes a plurality of redundant functional control channels, and each functional control channel is configured to supply digital actuator control commands. Each actuator controller is coupled to receive the digital actuator control commands supplied from at least two of the functional control channels. Each actuator controller is configured, upon receipt of the actuator control commands, to implement a command voting scheme to verify actuator control command integrity and, upon verifying actuator control command integrity, to generate and supply analog actuator position commands. Each actuator controller includes a primary channel and a backup channel, where each primary channel comprises a first controller, a second controller, and a duty cycle computation circuit, and each backup channel comprises a backup controller. Each electromechanical actuator is coupled to receive the actuator position commands from at least one of the actuator controllers and is configured, upon receipt thereof, to actuate a device. The first controller is coupled to receive the digital actuator control commands supplied from two of the functional control channels and is configured, upon receipt thereof, to supply first digital duty cycle commands. The second controller is coupled to receive the digital actuator control commands supplied from two of the functional control channels and is configured, upon receipt thereof, to supply second digital duty cycle commands. The duty cycle computation circuit coupled to receive the first digital duty cycle commands and the second digital duty cycle commands and is configured, upon receipt of the first and second duty cycle commands to (i) compute an average of the first and second duty cycle commands and (ii) generate pulse width modulated (PWM) commutation control signals based on the computed average. The backup controller is adapted to receive the digital actuator control commands supplied from two different functional control channels and configured, upon receipt thereof, to generate and supply backup PWM commutation control signals.

In yet another embodiment, a high-integrity electromechanical actuator control system includes a plurality of actuator controllers, and at least one electromechanical actuator. Each actuator controller is adapted to receive digital actuator control commands supplied from at least two functional control channels. Each actuator controller is configured, upon receipt of the actuator control commands, to implement a command voting scheme to verify actuator control command integrity and, upon verifying actuator control command integrity, to generate and supply analog actuator position commands. Each actuator controller includes a primary channel and a backup channel, where each primary channel comprises a first controller, a second controller, a duty cycle computation circuit, and a primary shut-off circuit, and each backup channel comprises a backup controller and a back-up shut-off circuit. Each electromechanical actuator is coupled to receive the actuator position commands from at least one of the actuator controllers and is configured, upon receipt thereof, to actuate a device. The first controller is coupled to receive the digital actuator control commands supplied from two of the functional control channels and is configured, upon receipt thereof, to supply first digital duty cycle commands. The second controller is coupled to receive the digital actuator control commands supplied from two of the functional control channels and is configured, upon receipt thereof, to supply second digital duty cycle commands. The duty cycle computation circuit coupled to receive the first digital duty cycle commands and the second digital duty cycle commands and is configured, upon receipt of the first and second duty cycle commands to (i) compute an average of the first and second duty cycle commands and (ii) generate pulse width modulated (PWM) commutation control signals based on the computed average. The primary shut-off circuit is in operable communication with the first controller, the second controller, and the duty cycle computation circuit, and is configured to selectively inhibit supply of the primary PWM commutation control signals. The backup controller is adapted to receive the digital actuator control commands supplied from two different functional control channels and configured, upon receipt thereof, to generate and supply backup PWM commutation control signals. The backup shut-off circuit is in operable communication with the backup controller and is configured to selectively inhibit supply of the backup PWM commutation control signals.

Furthermore, other desirable features and characteristics of the high-integrity electromechanical actuator control system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

When it is required to prevent loss of control, it is assumed that system functional redundancy is required, either by multiple redundant control devices/systems (e.g., surfaces, engines, etc.) to achieve a given function, or by redundancy in the control of an individual devices/systems, to meet industry standards for flight critical systems.

Some examples of embodiments actuator control systems that provide suitable system functional redundancy are depicted in FIGS. 1-4.

As depicted, each system 100, 200, 300, 400 includes a system function controller (SFC) 102, a plurality of actuator controllers (EMACs) 104 (e.g., 104-1, 104-2), and at least one electromechanical actuator (EMA) 106. In each of the depicted embodiments, the system function controller 102 includes two or more redundant functional control channels 108 (e.g., 108-1, 108-2, 108-3), each of which is configured to supply digital actuator control commands. Although the system function controllers 102 depicted in the embodiments of FIGS. 1-4 include at least two redundant functional control channels 108, it will be appreciated that other embodiments may include more or less than this number of redundant functional control channels 108. It will additionally be appreciated that the digital actuator control commands (which may be position and/or speed and/or direction) may be implemented using any one of numerous digital formats (e.g., CAN bus, ARINC bus, TTP bus, or other), and that the redundant functional control channels 108 may be similar or dissimilar channels.

No matter the number of functional control channels 108, each actuator controller 104 is coupled to receive the digital actuator control commands supplied from at least two of the functional control channels 108. For example, in the embodiment depicted in FIG. 1, the actuator controller 104 is coupled to receive the digital actuator control commands supplied from the first and second functional control channels 108-1, 108-2. In the embodiments depicted in FIGS. 2-4, one actuator controller 104-1 is coupled to receive the digital actuator control commands supplied from the first and second functional control channels 108-1, 108-2, and the other actuator controller 104-2 is coupled to receive the digital actuator control commands supplied from the second and third functional control channels 108-2, 108-3. It will be appreciated that in other embodiments, each actuator controller 104 may be coupled to receive the digital actuator control commands supplied from each of the functional control channels 108.

Figure 1:
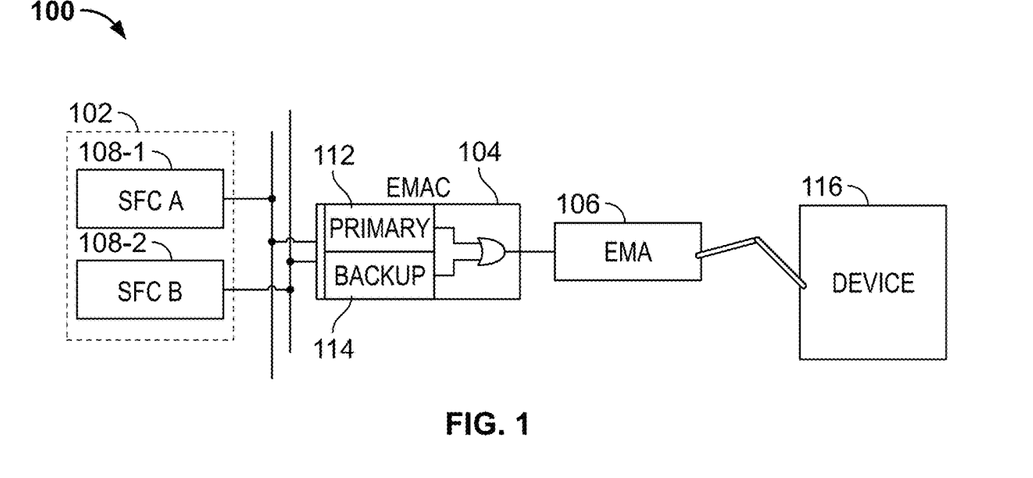
FIGS. 1-4 depict functional block diagrams of example embodiments of actuator control systems that implement various functional redundancy configurations.
Figure 2:
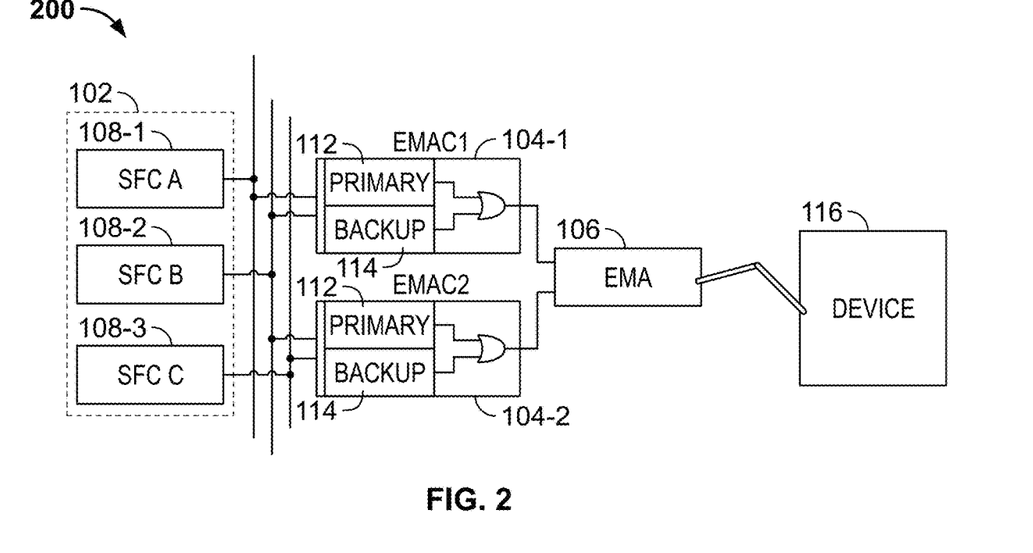
Figure 3:
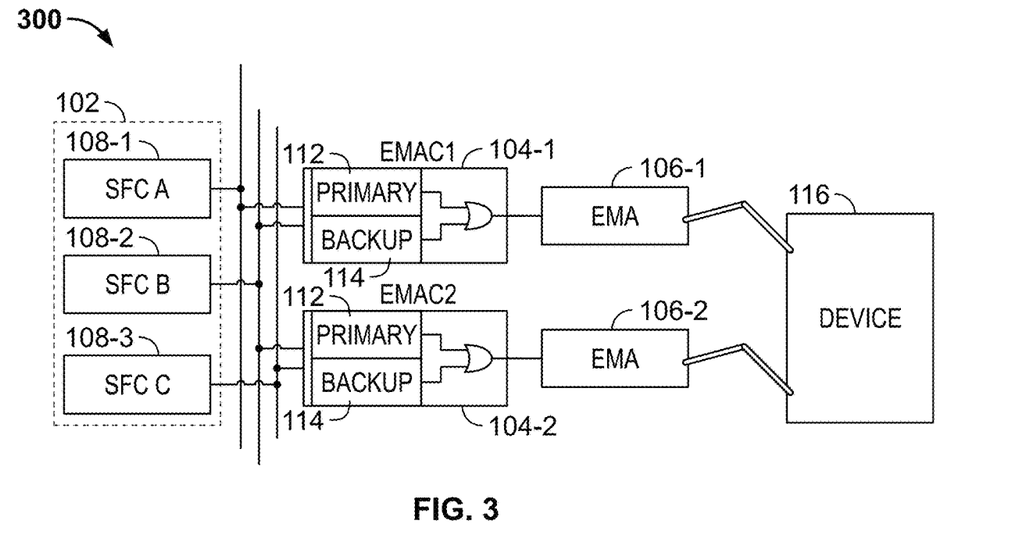
Figure 4:
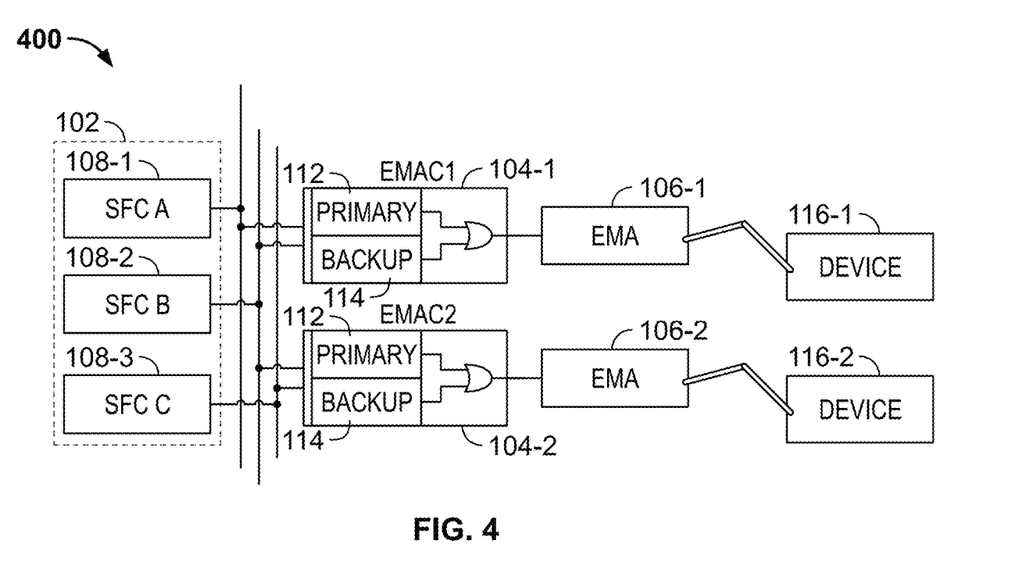
Figure 5:
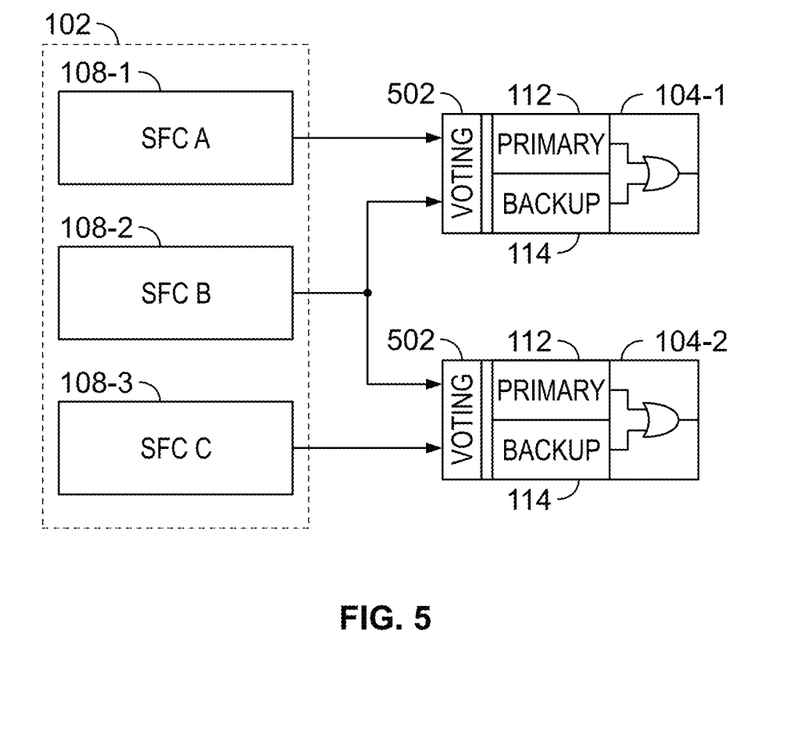
FIG. 5 depicts a functional block diagram of one embodiment of an actuator control system (without including the actuator or controlled device)

Regardless of which number of functional control channels 108 that each actuator controller 104 receives the actuator control commands from, each actuator controller 104, as depicted more clearly in FIG. 5, is configured, upon receipt of the actuator control commands, to implement a command voting scheme 502. The command voting scheme 502, as is generally known, is used to verify actuator control command integrity. Upon verifying the actuator control command integrity, each actuator controller 104 is further configured to generate and supply analog actuator commands.

Returning to FIGS. 1-4, it was previously noted that each system 100, 200, 300, 400 includes at least one electromechanical actuator 106. It was also previously noted that, to prevent loss of control, system functional redundancy is required. This redundancy can be implemented by one or combinations of redundancy within the actuator controller 104 (i.e., primary and backup computational channels) to drive a single output, by multiple redundant control devices (e.g., surfaces, engines, etc.) to achieve a given function, by redundancy in the control of the individual devices, or by various combinations. In each of the embodiments depicted in FIGS. 1-4, redundancy is implemented within the actuator controller(s) 104. That is, each actuator controller 104 includes a primary channel 112 and a backup channel 114. The system 100 in FIG. 1 includes a single primary/backup channel actuator controller 104 controlling one electromechanical actuator 106, which in turn is used to actuate one device 116. The system 200 in FIG. 2 includes redundant primary/backup channel actuator controllers 104-1, 104-2 controlling one electromechanical actuator 106 (which has separate motors), which in turn is used to actuate one device 116. The system 300 in FIG. 3 also includes redundant primary/backup channel actuator controllers and redundant electromechanical actuators 106 (106-1, 106-2), which together are used to actuate one device 116. The system 400 in FIG. 4 includes redundant primary/backup channel actuator controllers 104-1, 104-2 and redundant electromechanical actuators 106 (106-1, 106-2), each of which is used to actuate a separate, redundant device 116 (116-1, 116-2). No matter the number of electromechanical actuators 106, each is coupled to receive the actuator commands from at least one of the actuator controllers 104 and is configured, upon receipt thereof, to actuate a device 116

Figure 6:
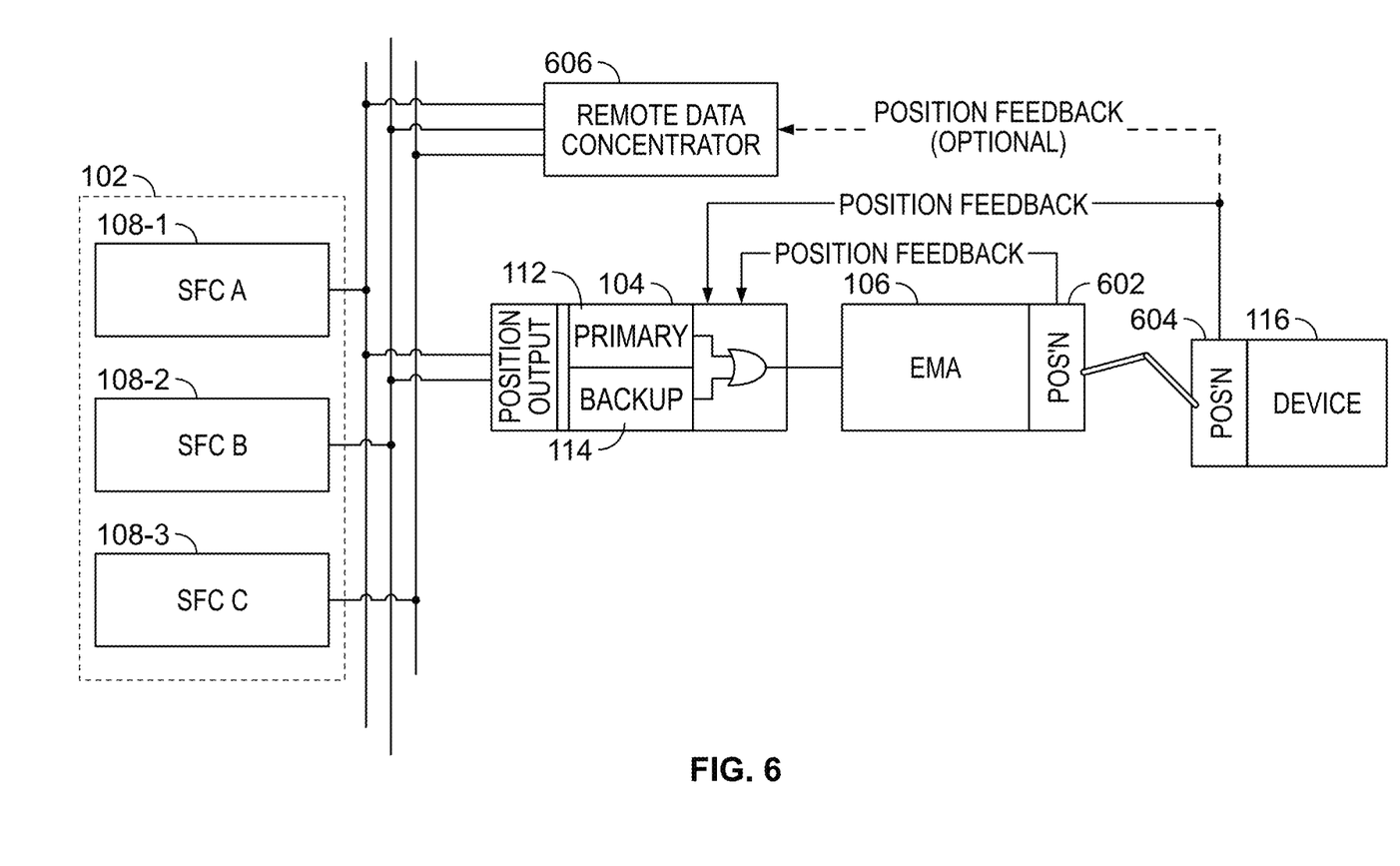
FIG. 6 depicts a more detailed functional block diagram of a portion of the system of FIG. 4 (including the actuator and controlled device)

Referring now to FIG. 6, it is seen that, in each system 100, 200, 300, 400, each channel 108 of the system function controller 102 receives feedback of the actual position (and/or speed and/or direction) of the actuator(s) 106 and/or the actuated device(s) 116 to monitor that the command was successfully implemented. This monitoring is provided in the unlikely, yet postulated event that significant errors manifest over several computational iterations of the actuator controller 104 (such errors are postulated to lead to "hard-over" failures or erroneous control). The system function controller 102, upon detecting erroneous control, disables the primary channel 112 in the actuator controller 104 from erroneously performing its function and optionally enables the backup channel 114 in the actuator controller 104.

The position (and/or speed and/or direction) feedback may be supplied from one or more actuator sensors 602 associated with each of the one or more actuators 106 and/or one or more device sensors 604 associated each of the one or more devices 116, via the controlling actuator controller 104-1 (104-2). In some embodiments, as FIG. 6 also depicts, the position (and/or speed and/or direction) feedback may be supplied from the one or more device sensors 604 associated with each of the one or more devices 116, via a remote data concentrator 606.

Before proceeding further, it is noted that the primary channel 112 in each actuator controller 104 uses a command-command (COM-COM) control method to provide high integrity actuator control. This COM-COM architecture is industry proven and has been used to drive an open wound brushless DC motor through two parallel gate drivers and inverters, as described in U.S. Pat. No. 8,084,972 (published as U.S. Patent Application Publication No. 2009/0128072), which is assigned to the Assignee of the instant application, and which is hereby incorporated by reference.

Also described in U.S. Pat. No. 8,084,972 is the use of a "simplified" COM-COM architecture, where each command controllers' (COM) duty-cycle output is averaged with the other command controllers' (COM) duty-cycle output, and the resulting averaged duty-cycle is fed to the respective three phases of a gate driver/inverter to a single brushless DC motor.

Figure 7:
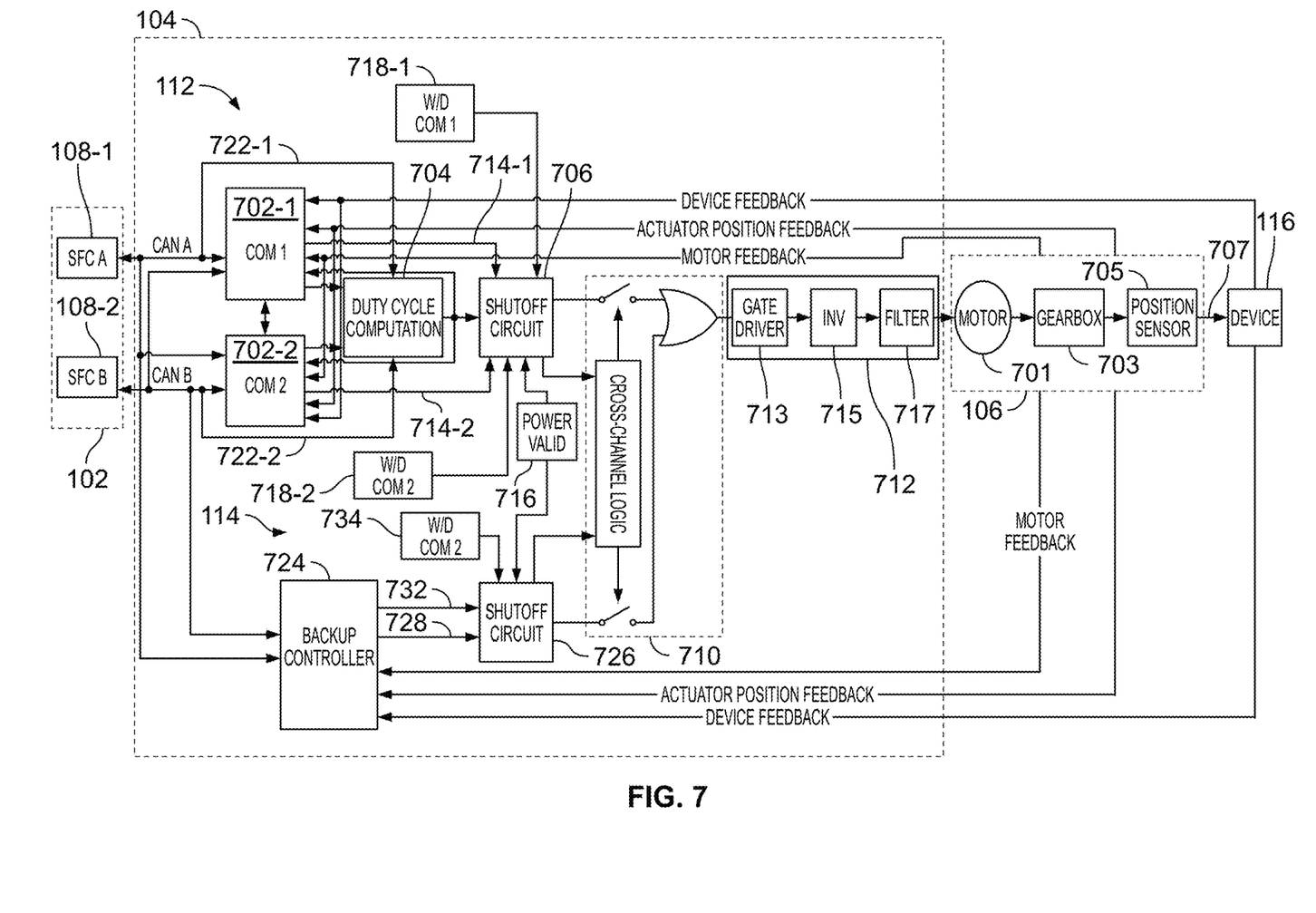
FIG. 7 is an even more detailed functional block diagram of one embodiment of an actuator control system.

With the above in mind, and with reference now to FIG. 7, a more detailed functional block diagram of one embodiment of one actuator controller 104 and an associated actuator 106 is depicted. As depicted therein, the actuator 106 includes an electric motor 701, a gearbox 703, a position sensor 705, and an actuation member 707 coupled to the device 116. The actuator 106 may be implemented using any one of numerous known electromechanical actuator configurations. As such, a detailed description thereof is not needed or provided.

Turning to the actuator controller 104, it includes the primary channel 112, the backup channel 114, cross-channel logic 710, and a motor driver 712. The primary channel 112 includes at least a first controller 702-1, a second controller 702-2, a duty cycle computation circuit 704, and a primary channel shut-off circuit 706. The first and second controllers 702-1, 702-2 implement a simplified command-command (COM-COM) architecture (see above). More specifically, the first controller 702-1 is coupled to receive the digital actuator control commands supplied from two of the functional control channels 108 and is configured, upon receipt thereof, to supply first digital duty cycle commands (in a binary or other digital form) 802-1 (see FIG. 8). The second controller 702-2 is also coupled to receive the digital actuator control commands supplied from two of the functional control channels 108 and is configured, upon receipt thereof, to supply second digital duty cycle commands (in a binary or other digital form) 802-2 (FIG. 8).

Figure 8:
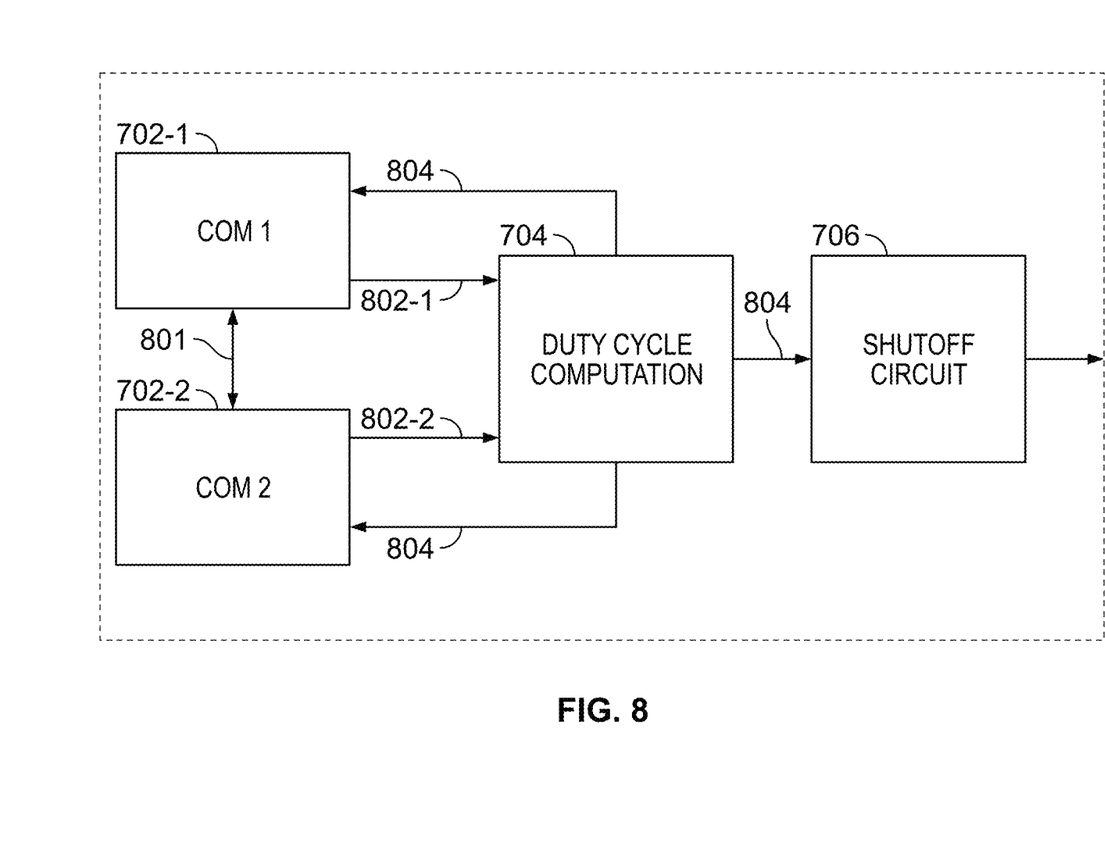
FIG. 8 depicts portions of the actuator control system of FIG. 7 in isolation.

It will be appreciated that the first and second controllers 702-1, 702-2, which may also be referred to herein as COM-COM controllers, may be implemented using two separate, individual microcontrollers (as shown in FIGS. 7 and 8) or as a single device embedded with dual controller cores that can operate independently or in lockstep manner. In either case, the first and second controllers 702-1, 702-2 are preferably identical in design and software to reduce development costs.

The duty cycle computation circuit 704 is coupled to receive the first digital duty cycle commands 802-1 and the second digital duty cycle commands 802-2. The duty cycle computation circuit 704 is configured, upon receipt of the first and second duty cycle commands 802-1, 802-2 to compute an average of the first and second duty cycle commands and, based on the computed average, to generate pulse width modulated (PWM) commutation control signals 804 (FIG. 8) indicative of the computed average. It will be appreciated that the duty cycle computation circuit 704 may be variously implemented. In the depicted embodiment, however, it is implemented using a field programmable gate array (FPGA) (or similar) device. No matter how it is specifically implemented, the digital duty cycle computation circuit 704 is independent and dissimilar from the first and second controllers 702-1, 702-2, and therefore is not susceptible to the same possible common mode failures as the first and second controllers 702-1, 702-2.

As FIG. 7 depicts, and as FIG. 8 depicts even more clearly, it is seen that the pulse width modulated (PWM) commutation control signals 804, which are indicative of the computed average of the first and second duty cycle commands, are fed back to the first and second controllers 702-1, 702-2. This is done so that each of the first and second controllers 702-1, 702-2 can confirm the operability of the duty cycle computation circuit 704 by confirming that the duty cycle computation circuit 704 properly converted the duty cycle commands 702-1, 702-2 into the PWM commutation control signals. To do so, and as FIGS. 7 and 8 further depict, the first and second controllers 702-1, 702-2 are in operable communication 801 (FIG. 8). This is so that each controller 702-1, 702-2 can provide the duty cycle commands 702-1, 702-2 it supplied to the duty cycle computation circuit 704 to the other controller 702-2, 702-1. The first and second controllers 702-1, 702-2 are each further configured to mathematically subtract the other controller's duty cycle commands 802-1, 802-2 from the pulse width modulated (PWM) commutation control signals 804, to thereby detect if the duty cycle computation circuit 704 properly converted its duty cycle commands into the PWM commutation control signals. More specifically, the first controller 702-1 mathematically subtracts the duty cycle commands 802-2 supplied by the second controller 702-2 from the PWM commutation control signals 804 to determine if the duty cycle computation circuit 704 properly converted its duty cycle commands 802-1 into the PWM commutation control signals 804, and the second controller 702-2 mathematically subtracts the duty cycle commands 802-1 supplied by the first controller 702-1 from the PWM commutation control signals 804 to determine if the duty cycle computation circuit 704 properly converted its duty cycle commands 802-2 into the PWM commutation control signals 804.

The primary channel shut-off circuit 706 is in operable communication with the first controller 702-1, the second controller 702-2, and the duty cycle computation circuit 704. The primary channel shut-off circuit 706, which is independent of the first and second controllers 702-1, 702-2 and the duty cycle computation circuit 704, is configured, using known techniques, to selectively inhibit supply of the PWM commutation control signals 804. More specifically, in the unlikely event that either or both controllers 702-1, 702-2 detect a failure of the duty cycle computation circuit 704 to properly convert its duty cycle commands into the PWM commutation control signals, the primary channel shut-off circuit 706 will be supplied with one or more shut-off commands. The primary channel shut-off circuit 706, in response to the one or more shut-off commands, will inhibit the supply of the PWM commutation control signals. As may be readily appreciated, if the first controller 702-1 detects the failure, it will supply a first shut-off command 714-1, if the second controller 702-2 detects the failure, it will supply a second shut-off command 714-2, and if both controllers 702-1, 702-2 detect the failure, primary the shut-off circuit 706 will receive the first and second shut-off commands 714-1, 714-2.

As FIG. 7 also depicts, the primary channel shut-off circuit 706, at least in the depicted embodiment, is also configured to inhibit the supply of the PWM commutation control signals should two other unlikely events occur. One of the unlikely events is a hardware detected power invalid condition 716 that could potentially cause a controller hardware or software failure. The other unlikely event is a hardware detected, real-time software computational overrun (e.g., "watchdog" overrun) 718-1, 718-2 in either or both of the first or second controllers 702-1, 702-2.

In addition to the above, and as FIG. 7 further depicts, it is seen that, at least in the depicted embodiment, the individual functional control channels 108 may supply a functional control channel shut-off command 722-1, 722-2 to the duty cycle computation circuit 704. Such a command is supplied in the unlikely event the system function controller 102 detects a malfunction that was caused by a common mode failure of the first and second controllers 702-1, 702-2.

The backup channel 114 is used when there is a failure of the primary channel 112, and thus does not have as many of the "fail-safe" features as the primary channel 112. The backup channel 114 includes a backup controller 724 and a backup channel shut-off circuit 726. The backup controller 724 is coupled to receive the digital actuator control commands supplied from two of the functional control channels 108 and is configured, upon receipt thereof, to generate and supply backup PWM commutation control signals 728. The backup controller 724 is implemented using a dissimilar microcontroller or FPGA, and it performs position control computations redundant to the first and second controllers 702-1, 702-2. Thus, and as FIG. 7 depicts, the backup controller 724 receives the same digital actuator control commands (and implements the above-described command voting scheme 502) as the first and second controllers 702-1, 702-2. The backup controller 724 also receives the same feedback as the first and second controllers 702-1, 702-2 (i.e., motor current, rotor position/direction speed, actuator position, device position).

The backup controller 724 is implemented using a dissimilar microcontroller (or FPGA) than is used in the primary channel 112. This is necessary to overcome a "common mode" failure of either the first and second controllers 702-1, 702-2 or the duty cycle computation circuit 704, which are classified as "complex" devices for certification purposes, where common mode loss of these devices would result in total loss of device control across the entire system 100 (potentially at the same time).

The backup channel shut-off circuit 726 is in operable communication with, and is independent of, the backup controller 724. The backup channel shut-off circuit 726, is configured, using known techniques, to selectively inhibit supply of the backup PWM commutation control signals 728. More specifically, in the unlikely event that the backup controller 724 fails, the backup channel shut-off circuit 726 will be supplied with a backup shut-off command 732. The backup channel shut-off circuit 726, in response to the backup shut-off command 732, will inhibit the supply of the backup PWM commutation control signals 728. As FIG. 7 also depicts, the backup channel shut-off circuit 726, at least in the depicted embodiment, is also configured to inhibit the supply of the backup PWM commutation control signals should two other unlikely events occur. One of the unlikely events is the previously mentioned hardware detected power invalid condition 716 that could potentially cause a controller hardware or software failure. The other unlikely event is a hardware detected, real-time software computational overrun (e.g., "watchdog" overrun) 734 in the backup controller 724.

It is noted that the backup channel shut-off circuit 726 is implemented using simple electronic devices. These electronic devices are not subject to the same complex device certification requirements where a single, common-mode failure considers loss of all devices at the same time. These electronic devices are also not the subject of specialized development assurance processes at the device development level.

The cross-channel logic 710, which is also comprised of simple electronic devices, controls which channel 112, 114 supplies its PWM commutation control signals 804, 728 to the motor driver 712. The cross-channel logic 710 is configured, using channel active/inactive state logic, to determine the functional availability of the primary and backup channels 112, 114 to arbitrate which channel's PWM commutation control signals are passed through to the motor driver 712.

More specifically, the cross-channel logic 710 is configured such that the primary channel 112 maintains active control when the primary channel shut-off circuit 706 is not inhibiting the supply of the PWM commutation control signals 804. Thus, as long as the primary channel 112 is healthy, it has priority over the backup channel 114. The cross-channel logic 710 disables the primary channel 112, and enables the backup channel 114, when the primary channel shut-off circuit 706 is inhibiting the supply of the PWM commutation control signals 804 and when the backup channel shut-off circuit 726 is not inhibiting the supply of the backup PWM commutation control signals 728. If the backup channel shut-off circuit 726 is inhibiting the supply of the backup PWM commutation control signals 728 for any reason, the cross-channel logic 710 ensures that the backup channel 114 cannot supply the backup PWM commutation control signals 728 to the motor driver 712. Although the cross-channel logic 710 is depicted as a separate circuit, it will be appreciated that it can be implemented into the shut-off circuits 706, 726 for the respective channels 112, 114.

The motor driver 712 is coupled to receive the PWM commutation control signals from either the primary channel 112 or the backup channel 114 and is configured, upon receipt of the commutation control signals, to supply multiphase motor drive current to the motor 701 using known techniques. Although the motor driver 712 may be variously implemented to carry out this function, in the depicted embodiment, it includes at least a gate driver circuit 713 and an inverter circuit 715. The motor driver 712, at least in the depicted embodiment, may also include a suitable filter circuit 717.

The systems described herein may be used on multiple flight control, electric motor tilt, and motor propeller pitch actuation systems; or any other critical aircraft systems requiring electromechanical actuation.

The systems described herein satisfy aircraft certification criteria and provide an efficient weight and cost system and equipment design, with a clever application of redundancy, command and monitoring function, dissimilarity, and independence between and within the EMACs.

The systems described herein differ from previously known architectures, and removes significant actuator controller cost, size, and weight, by using a simplified COM-COM approach, and not two completely redundant inverters in the same actuator controller, and by not using open end wound (OEW) motors.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like.

The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A high-integrity electromechanical actuator control system, comprising:
   a plurality of actuator controllers, each actuator controller adapted to receive digital actuator control commands supplied from at least two different functional control channels, each actuator controller configured, upon receipt of the actuator control commands, to implement a command voting scheme to verify actuator control command integrity and, upon verifying actuator control command integrity, to generate and supply analog actuator position commands, each actuator controller including a primary channel and a backup channel, each primary channel comprising a first controller, a second controller, and a duty cycle computation circuit, each backup channel comprising a backup controller; and
   at least one electromechanical actuator coupled to receive the actuator position commands from at least one of the actuator controllers and configured, upon receipt thereof, to actuate a device,
   wherein:
      the first controller is adapted to receive the digital actuator control commands supplied from two different functional control channels and is configured, upon receipt thereof, to supply first digital duty cycle commands,
      the second controller is adapted to receive the digital actuator control commands supplied from two different control channels and is configured, upon receipt thereof, to supply second digital duty cycle commands,
      the duty cycle computation circuit is coupled to receive the first digital duty cycle commands and the second digital duty cycle commands and is configured, upon receipt of the first and second duty cycle commands to (i) compute an average of the first and second duty cycle commands and (ii) generate and supply primary pulse width modulated (PWM) commutation control signals based on the computed average,
      the backup controller is adapted to receive the digital actuator control commands supplied from two different functional control channels and is configured, upon receipt thereof, to generate and supply backup PWM commutation control signals, and
      a motor driver coupled to receive either the primary PWM commutation control signals or the backup PWM commutation control signals and configured, upon receipt thereof, to supply multi-phase motor drive current.

2. The system of claim 1, further comprising: a cross-channel logic circuit in operable communication with the primary channel and the backup channel and configured to control which channel supplies its PWM commutation control signals to the motor driver.

3. The system of claim 2, wherein the cross-channel logic circuit implements channel active/inactive state logic to determine functional availability of the primary and backup channels, to thereby arbitrate which channel supplies its PWM commutation control signals to the motor driver.

4. The system of claim 1, wherein:
   the first controller is coupled to receive the second digital duty cycle signals and the primary PWM commutation control signals and is configured, upon receipt of these signals, to confirm operability of the duty cycle computation circuit; and
   the second controller is coupled to receive the first digital duty cycle signals and the primary PWM commutation control signals and is configured, upon receipt of these signals, to confirm operability of the duty cycle computation circuit.

5. The system of claim 4, wherein:
   the first controller is configured to mathematically subtract the second digital duty cycle signals from the primary PWM commutation control signals; and
   the second controller is configured to mathematically subtract the first digital duty cycle signals from the primary PWM commutation control signals.

6. The system of claim 1, wherein each actuator controller further comprises:
   a primary shut-off circuit in operable communication with the first controller, the second controller, and the duty cycle computation circuit, the primary shut-off circuit configured to selectively inhibit supply of the primary PWM commutation control signals; and
   a backup shut-off circuit in operable communication with the backup controller, the backup shut-off circuit configured to selectively inhibit supply of the backup PWM commutation control signals.

7. The system of claim 1, wherein the backup controller is dissimilar to the first controller and the second controller.

8. A high-integrity electromechanical actuator control system, comprising:
   a system function controller comprising a plurality of redundant functional control channels, each functional control channel configured to supply digital actuator control commands;
   a plurality of actuator controllers, each actuator controller coupled to receive the digital actuator control commands supplied from at least two of the functional control channels, each actuator controller configured, upon receipt of the actuator control commands, to implement a command voting scheme to verify actuator control command integrity and, upon verifying actuator control command integrity, to generate and supply analog actuator position commands, each actuator controller including a primary channel and a backup channel, each primary channel comprising a first controller, a second controller, and a duty cycle computation circuit, each backup channel comprising a backup controller; and
   at least one electromechanical actuator coupled to receive the actuator position commands from at least one of the actuator controllers and configured, upon receipt thereof, to actuate a device,
   wherein:
      the first controller is adapted to receive the digital actuator control commands supplied from two different functional control channels and configured, upon receipt thereof, to supply first digital duty cycle commands,
      the second controller is adapted to receive the digital actuator control commands supplied from two different control channels and is configured, upon receipt thereof, to supply second digital duty cycle commands,
      the duty cycle computation circuit is coupled to receive the first digital duty cycle commands and the second digital duty cycle commands and configured, upon receipt of the first and second duty cycle commands to (i) compute an average of the first and second duty cycle commands and (ii) generate and supply primary pulse width modulated (PWM) commutation control signals based on the computed average, the backup controller is adapted to receive the digital actuator control commands supplied from two different functional control channels and configured, upon receipt thereof, to generate and supply backup PWM commutation control signals, and a motor driver coupled to receive either the primary PWM commutation control signals or the backup PWM commutation control signals and configured, upon receipt thereof, to supply multi-phase motor drive current.

9. The system of claim 8, further comprising: a cross-channel logic circuit in operable communication with the primary channel and the backup channel and configured to control which channel supplies its PWM commutation control signals to the motor driver.

10. The system of claim 9, wherein the cross-channel logic circuit implements channel active/inactive state logic to determine functional availability of the primary and backup channels, to thereby arbitrate which channel supplies its PWM commutation control signals to the motor driver.

11. The system of claim 8, wherein:
the first controller is coupled to receive the second digital duty cycle signals and the primary PWM commutation control signals and is configured, upon receipt of these signals, to confirm operability of the duty cycle computation circuit; and
the second controller is coupled to receive the first digital duty cycle signals and the primary PWM commutation control signals and is configured, upon receipt of these signals, to confirm operability of the duty cycle computation circuit.

12. The system of claim 11, wherein:
the first controller is configured to mathematically subtract the second digital duty cycle signals from the primary PWM commutation control signals; and
the second controller is configured to mathematically subtract the first digital duty cycle signals from the primary PWM commutation control signals.

13. The system of claim 8, wherein each actuator controller further comprises:
a primary shut-off circuit in operable communication with the first controller, the second controller, and the duty cycle computation circuit, the primary shut-off circuit configured to selectively inhibit supply of the primary PWM commutation control signals; and
a backup shut-off circuit in operable communication with the backup controller, the backup shut-off circuit configured to selectively inhibit supply of the backup PWM commutation control signals.

14. The system of claim 8, wherein the backup controller is dissimilar to the first controller and the second controller.

15. A high-integrity electromechanical actuator control system, comprising:
a plurality of actuator controllers, each actuator controller adapted to receive digital actuator control commands supplied from at least two different functional control channels, each actuator controller configured, upon receipt of the actuator control commands, to implement a command voting scheme to verify actuator control command integrity and, upon verifying actuator control command integrity, to generate and supply analog actuator position commands, each actuator controller including a primary channel and a backup channel, each primary channel comprising a first controller, a second controller, a duty cycle computation circuit, and a primary shut-off circuit, each backup channel comprising a backup controller and a backup shut-off circuit; and at least one electromechanical actuator coupled to receive the actuator position commands from at least one of the actuator controllers and configured, upon receipt thereof, to actuate a device, wherein:
the first controller is adapted to receive the digital actuator control commands supplied from two different functional control channels and is configured, upon receipt thereof, to supply first digital duty cycle commands,
the second controller is adapted to receive the digital actuator control commands supplied from two different control channels and is configured, upon receipt thereof, to supply second digital duty cycle commands,
the duty cycle computation circuit is coupled to receive the first digital duty cycle commands and the second digital duty cycle commands and is configured, upon receipt of the first and second duty cycle commands to (i) compute an average of the first and second duty cycle commands and (ii) generate and supply primary pulse width modulated (PWM) commutation control signals based on the computed average,
the primary shut-off circuit is in operable communication with the first controller, the second controller, and the duty cycle computation circuit, the primary shut-off circuit is configured to selectively inhibit supply of the primary PWM commutation control signals, the backup controller is dissimilar to the first and second controllers,
the backup controller is adapted to receive the digital actuator control commands supplied from two different functional control channels and is configured, upon receipt thereof, to generate and supply backup PWM commutation control signals,
the backup shut-off circuit is in operable communication with the backup controller, the backup shut-off circuit is configured to selectively inhibit supply of the backup PWM commutation control signals, and
a motor driver coupled to receive either the primary PWM commutation control signals or the backup PWM commutation control signals and configured, upon receipt thereof, to supply multi-phase motor drive current.

16. The system of claim 15, further comprising: a cross-channel logic circuit in operable communication with the primary channel and the backup channel and configured to control which channel supplies its PWM commutation control signals to the motor driver, wherein the cross-channel logic circuit implements channel active/inactive state logic to determine functional availability of the primary and backup channels, to thereby arbitrate which channel supplies its PWM commutation control signals to the motor driver.

17. The system of claim 15, wherein:
the first controller is coupled to receive the second digital duty cycle signals and the primary PWM commutation control signals and is configured, upon receipt of these signals, to confirm operability of the duty cycle computation circuit; and
the second controller is coupled to receive the first digital duty cycle signals and the primary PWM commutation control signals and is configured, upon receipt of these signals, to confirm operability of the duty cycle computation circuit, wherein:

the first controller is configured to mathematically subtract the second digital duty cycle signals from the primary PWM commutation control signals; and the second controller is configured to mathematically subtract the first digital duty cycle signals from the primary PWM commutation control signals.

* * * * *